US008724583B2

(12) United States Patent
Gundavelli et al.

(10) Patent No.: US 8,724,583 B2
(45) Date of Patent: May 13, 2014

(54) NEIGHBOR DISCOVERY MESSAGE HANDLING TO SUPPORT ROAMING OF WIRELESS MOBILE CLIENT DEVICES

(75) Inventors: Srinath Gundavelli, San Jose, CA (US); Abhijit Choudhury, Cupertino, CA (US); Rohit Suri, Fremont, CA (US); Venkatesh Kanagasabapathy, San Jose, CA (US); Bhavannarayana Nelakanti, Sunnyvale, CA (US); Sudhir Jain, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 1061 days.

(21) Appl. No.: 12/612,131

(22) Filed: Nov. 4, 2009

(65) Prior Publication Data

US 2011/0103344 A1    May 5, 2011

(51) Int. Cl.
*H04W 4/00*    (2009.01)

(52) U.S. Cl.
USPC ........... 370/331; 370/330; 370/338; 455/437; 455/438; 455/439; 455/451

(58) Field of Classification Search
USPC .......... 370/328–331, 338; 455/436–439, 450, 455/451
See application file for complete search history.

(56) References Cited

U.S. PATENT DOCUMENTS

| | | | |
|---|---|---|---|
| 5,758,281 A | 5/1998 | Emery et al. | |
| 6,490,259 B1 | 12/2002 | Agrawal et al. | |
| 6,654,359 B1 | 11/2003 | La Porta et al. | |
| 6,970,459 B1 | 11/2005 | Meier | |
| 7,061,896 B2 | 6/2006 | Jabbari et al. | |
| 7,710,872 B2* | 5/2010 | Vasseur | 370/230 |
| 2002/0085719 A1 | 7/2002 | Crosbie | |
| 2004/0221042 A1 | 11/2004 | Meier | |
| 2004/0252653 A1 | 12/2004 | Shimizu et al. | |
| 2005/0036471 A1* | 2/2005 | Singh et al. | 370/338 |
| 2005/0165953 A1* | 7/2005 | Oba et al. | 709/238 |
| 2006/0187878 A1 | 8/2006 | Calhoun et al. | |
| 2006/0240825 A1* | 10/2006 | Funabiki et al. | 455/436 |
| 2006/0245404 A1 | 11/2006 | Bajic | |
| 2007/0070959 A1 | 3/2007 | Almeroth et al. | |
| 2007/0140163 A1 | 6/2007 | Meier et al. | |

(Continued)

FOREIGN PATENT DOCUMENTS

WO    2010053624 A1    5/2010

OTHER PUBLICATIONS

Johnson et al., "Mobility Support in IPv6", Network Working Group, The Internet Society; Jun. 2004, RFC 3775, pp. 1-143.

(Continued)

*Primary Examiner* — Christopher Grey
(74) *Attorney, Agent, or Firm* — Edell, Shapiro & Finnan, LLC

(57) ABSTRACT

Techniques are provided herein to support roaming of wireless mobile client devices from one wireless local area network access point device to another wireless local area network access point device. Neighbor discovery messages are received from wireless mobile client devices. A neighbor discovery message specifies a target address for a neighbor discovery function. A response to a neighbor discovery message is sent to a wireless mobile client device such that the response message appears to have been sent by a wireless mobile client device that has an address that corresponds to the target address of the neighbor discovery message.

25 Claims, 7 Drawing Sheets

(56) References Cited

U.S. PATENT DOCUMENTS

| | | |
|---|---|---|
| 2007/0160008 A1 | 7/2007 | Burgess |
| 2007/0160017 A1 | 7/2007 | Meier et al. |
| 2008/0002607 A1 | 1/2008 | Nagarajan et al. |
| 2008/0002642 A1 | 1/2008 | Borkar et al. |
| 2008/0043665 A1* | 2/2008 | Jeon et al. ............... 370/328 |
| 2008/0107070 A1 | 5/2008 | Sastry |
| 2008/0130598 A1 | 6/2008 | Kalhan |
| 2008/0175201 A1 | 7/2008 | Ahmavaara et al. |
| 2009/0040987 A1* | 2/2009 | Hirano et al. ............. 370/338 |
| 2009/0059924 A1* | 3/2009 | Muramoto et al. ........ 370/390 |
| 2009/0093232 A1 | 4/2009 | Gupta et al. |
| 2009/0161590 A1 | 6/2009 | Lewis et al. |
| 2010/0172293 A1 | 7/2010 | Toth et al. |
| 2010/0232306 A1* | 9/2010 | Jeon et al. ............... 370/252 |
| 2010/0290398 A1 | 11/2010 | Choudhary et al. |

OTHER PUBLICATIONS

Narten et al., "Neighbor Discovery for IP Version 6 (IPv6)", Network Working Group, RFC 4861, Sep. 2007, pp. 1-84.

Prommak C., et al., "Next Generation Wireless LAN System Design," Military Communications Conference, MILCOM 2002, Proceedings, Anaheim, CA, Oct. 7-10, 2002, NY NY, US vol. 1, Oct. 7, 2002, pp. 473-477.

\* cited by examiner

NEIGHBOR DISCOVERY MESSAGE HANDLING TO SUPPORT ROAMING OF WIRELESS MOBILE CLIENT DEVICES

TECHNICAL FIELD

The present disclosure relates to supporting mobility for wireless mobile client devices in a network environment where wireless mobile client devices may roam from one wireless local area network access point device to another wireless local area network access point device.

BACKGROUND

Internet Protocol version 6 (IPv6) is the next-generation internetworking protocol version designated as the successor to IPv4. IPv4 is the first implementation used in the Internet and is still widely used. These protocols are used as an Internet Layer protocol for packet-switched internetworks.

There a class of messages used in the IPv6 protocol known as "Neighbor Discovery" messages. Examples of Neighbor Discovery messages are Router Solicitation, Router Advertisement, Neighbor Solicitation, and Neighbor Advertisement messages. These messages enable nodes to communicate on an IPv6 link, discover routers, resolve layer-2 addresses, and to perform other related functions.

The IPv6 protocol supports stateless auto-configuration, whereby a node can generate a 128-bit address, by itself, based on the first 64-bits (prefix), present in a Router Advertisement message sent by the IPv6 router on the link. Consequently, a node need not send a request to a dynamic host configuration protocol (DHCP) server for an address. On the other hand, in some network environments a network router may be configured to perform neighbor discovery functions using (stateful) DHCPv6 techniques.

The network address generation feature of IPv6 presents certain challenges to avoid address IPv6 address conflicts when a wireless client device roams from a wireless access point device that hosts one virtual local area network to a wireless access point that hosts another virtual local area network.

DESCRIPTION OF EXAMPLE EMBODIMENTS

Overview

Techniques are provided herein to manage neighbor discovery messages in an environment where wireless mobile client devices roam from one wireless access point device to another access point device. In one embodiment, neighbor discovery messages are sent by wireless mobile client devices capable of roaming between wireless access point devices that are configured to serve wireless mobile client devices that are part of different virtual local area networks. These neighbor discovery messages are received at a controller configured to manage wireless access point devices that serve CDs in a virtual local area network. A neighbor discovery message specifies a target address for a neighbor discovery function. There are a variety of neighbor discovery functions for which the neighbor discovery messages are sent. A response message is sent to a first wireless mobile client device that sent a neighbor discovery message, where the response message is configured to appear to the first wireless mobile client device as if it was sent by the second wireless mobile client device that has an address corresponding to the target address specified in the neighbor discovery message.

Example Embodiments

Figure 1:
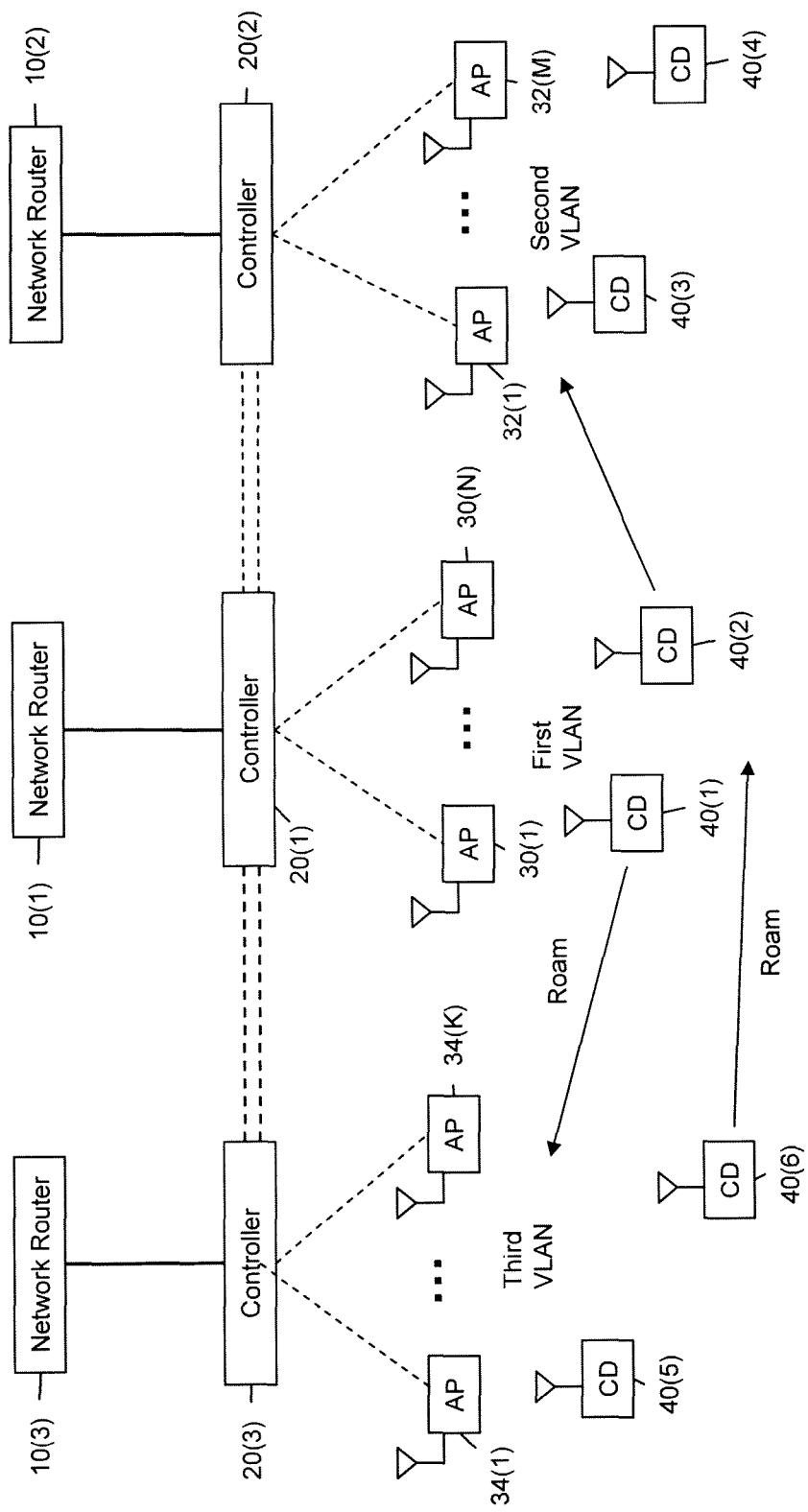
FIG. 1 is a block diagram of a communication network environment comprising multiple wireless access points between which wireless mobile client devices may roam.

Reference is first made to FIG. 1 that shows a block diagram of a networking environment to which the techniques described herein are applicable. The configuration shown in FIG. 1 generally depicts a configuration that is common in bridging a wired network with a wireless network. There is a first network router 10(1) on a first virtual local area network (VLAN), where a VLAN is defined as logically a different IPv6 subnet. The first network router 10(1) communicates, via a control and provisioning of wireless access point (CAPWAP) tunnel or other layer2/layer3 tunnel, with a first controller 20(1). The first controller 20(1) is also referred to herein as a "Home" controller with respect to certain devices for reasons that will become apparent hereinafter.

The first controller 20(1) communicates with and controls one or more wireless LAN (WLAN) access points (APs) 30(1)-30(N) via CAPWAP or other layer2/layer3 tunnels. The first controller 20(1) serves as a bridge between the wired network of which the network router 10(1) is a part and the wireless network served by the APs 30(1)-30(N). The APs 30(1)-30(N) provide wireless connectivity with wireless client devices (CDs), an example of which are shown at reference numerals 40(1) and 40(2).

Similarly, there is a network router 10(2) that communicates with a second controller 20(2) that is associated with a second VLAN. The second controller 20(2) communicates with and controls APs 32(1)-32(M), and these APs provide wireless connectivity with CDs 40(3) and 40(4), for example. Likewise, there is a network router 10(3) that communicates with a third controller 20(3). The third controller 20(3) communicates with and controls APs 33(1)-33(K), and these APs provide wireless connectivity with CDs 40(5) and 40(6), for example.

The first controller 20(1) controls the APs 30(1)-30(N) which serve CDs which belong to a particular subnet and thus may be said to belong to a first VLAN insofar as those CDs are associated with a unique IPv6 subnet served by network router 10(1). Likewise, the second controller 20(2) controls the APs 32(1)-32(M) which serve CDs that belong to a second subnet and thus belong to a second VLAN served by network router 10(2). The same can be said with respect to the third controller 20(3) that controls the APs 33(1)-33(K) which serve CDs that belong to a third subnet or third VLAN served by network router 10(3). The controllers 20(1)-20(3) are, for example, wireless LAN controller devices that are configured to provide a management point for a group of APs, and to route traffic between the wired and wireless networks. An AP may be said to host a VLAN in that it serves CDs that belong to that VLAN. Multiple APs under control of the same controller may host the same VLAN in that those multiple APs may serve CDs in the same VLAN. When a CD roams from one AP to another AP, the CD may attach to an AP that is not responsible for hosting that CD's VLAN.

There is a CAPWAP or other layer-2/layer-3 tunnel set up between a controller and every AP under its control. This is shown in the dotted lines drawn between controller 20(1) and APs 30(1)-30(N), for example. There is also a CAPWAP or other layer-2/layer-3 tunnel set up between each controller and every other controller. This is shown by the double dotted lines between controllers 20(1)-20(3). The dotted line between each router and its corresponding controller is meant to indicate that these two devices are not necessary directly connected to each other; there may be intervening device.

It is to be further understood that the configuration shown in FIG. 1 is a very simple configuration and that there are, in practice, many more controllers and VLANs in any given network environment. Furthermore, the term "AP" or wireless access point device is meant to refer to any wireless device that provides wireless connectivity in a wireless network, and is not to be limited to, for example, IEEE 802.11 APs. For example the techniques described herein are applicable to other wireless networks, such as a WiMAX™ wireless network, where devices known as base stations in WiMAX parlance perform functions similar to that of an AP in an IEEE 802.11 wireless network. Likewise, the term "controller" or "WLAN controller" is meant to refer to any control element that controls a wireless device that provides wireless connectivity in wireless network, and includes for example, a wireless gateway device. A WiMAX wireless network is only one example of other wireless networks to which these techniques are applicable. Thus, the configuration shown in FIG. 1 is only meant to be an example for purposes of describing the techniques herein.

The CDs shown in FIG. 1 may be mobile and thus move between coverage areas of APs. Each VLAN has different IPv6 subnet/prefix. When a CD first attaches (or in WLAN parlance "associates") with any of the wireless APs controlled by one of the controllers 20(1)-20(3), the CD will be made part of that VLAN (IPv6 subnet) which that AP or an associated switch is configured to serve. The CD then is said to belong to or is a part of that VLAN. As part of creating this association between the CD and the VLAN, unique IPv6 addresses are assigned to the CD using the aggregate prefix block (subnet block) allocated to the VLAN. When the CD's state is removed, these addresses are released and recycled.

An IPv6 node address is a 128-bit record represented as eight fields of up to four hexadecimal digits. A colon separates each field. An example of an IPv6 address is 3ffe:ffff: 101::230:6eff:fe04:d9ff. The symbol "::" is special syntax that is used as a shorthand way of representing multiple 16-bit groups of contiguous zeros. To indicate a subnetwork (subnet) address, the IPv6 standard uses subnet prefixes similar to the IPv6 format. An IPv6 node address and its subnet prefix length can be represented as: <IPv6-Node-Address>/<Prefix-Length>, where <IPv6-Node-Address> is an IPv6 address and <Prefix-Length> is a decimal value specifying how many of the leftmost contiguous bits of the IPv6 address make up the subnet prefix. Each VLAN is assigned or associated with an aggregated IPv6 prefix block.

The term "link-layer address" refers to a layer-2, e.g., physical layer, address. An example of a layer-2 address is a media access control (MAC) address. The term "link-local address" refers to an address used on a specific layer-3 link, such as an IPv6 address in the case of a network address used on a wired network link or an IEEE 802.11 address in the case of a network address used on a wireless network link. A controller needs to use a link-local address, i.e., an IPv6 address, for interfacing link-local traffic over the wired network. A further description of link-local addresses and their selection by controllers is described hereinafter.

The IPv6 protocol uses a series of messages called Neighbor Discovery (ND) messages. ND messages are Internet Control Message Protocol (ICMP) messages used by IPv6 nodes on a link, and include Router Solicitation (RS) messages, Router Advertisement (RA) messages, Neighbor Solicitation (NS) messages, and Neighbor Advertisement (NA) messages. These messages form the basic mechanism for nodes to communicate on an IPv6 link, discover routers, confirm a network address it generates is not already in use, resolve layer-2 addresses, etc.

IPv6 protocol supports stateless auto-configuration. A node generates a 128-bit address, by itself, based on the first 64-bits (prefix) present in an RA sent by the IPv6 router on the link. In this way, a node does not need to perform a DHCP request for an address. On the other hand, there may be situations where some network routers in a network are configured to use the stateful network address request process of DHCP.

Assuming for the sake of an example that CDs 40(1) and 40(2) first enter the mobility or wireless network domain at one of the APs 30(1)-30(N), then these CDs are assigned an IPv6 address with a subnet prefix that corresponds to a subnet prefix assigned to the network router 10(1). Specifically, the controller 20(1) allocates an IPv6 subnet prefix of network router 10(1) as the network prefix for CDs 40(1) and 40(2). The controller at which the CD initially enters the mobility domain stores entry information for that CD comprising a media access control (MAC) address for the CD, assigned IPv6 home network prefix and home controller ID (e.g., ID for controller 20(1)). Thus, the VLAN for CDs 40(1) and 40(2) is the first VLAN under control of the controller 20(1) and corresponding to network router 10(1). Once this initial VLAN assignment is made, the CDs 40(1) and 40(2) will always be part of the first VLAN and all other controllers (and APs) will store data indicating that association. A CD can obtain one or more IPv6 network addresses from the prefix corresponding to its initial VLAN it discovers when entering the mobility domain, and can retain those addresses even after moving anywhere within the mobility domain. Consequently, with respect to CDs 40(1) and 40(2), the second controller 20(2) and third controller 20(3) are referred to as "foreign" controllers because they control APs that are configured to serve CDs in other VLANs.

Consider the following scenario. A CD that is part of the first VLAN, e.g., CD 40(1), roams and attaches to AP 34(K) that is configured to serve CDs in the third VLAN. The first VLAN has an IPv6 prefix (subnet) of CAFE::1/64 and the third VLAN has an IPv6 prefix of BABA::1/64, for example. Another CD, e.g., CD 40(2), whose home VLAN is the first VLAN, roams and attaches to AP 32(1) that is configured to serve CDs in the second VLAN.

In this example, the IPv6 router 10(1) associated with the first VLAN needs to forward packets to IPv6-Address-1, which belongs to CD 40(1). The router 10(1) needs to find the layer-2 address, e.g., MAC, address from IPv6-Address-1, so it can forward the message on the link. To do so, the router sends an NS message to a solicited-node-multicast-group address corresponding to the address that it is attempting to resolve. In a network where CDs are fixed at a given link, the NS message hits the nodes registered to listen on that multicast group. However, in a network environment such as that shown in FIG. 1, the target node may not be connected to an AP that is configured to serve that VLAN at that time because the target node has roamed to some other AP. For neighbor discovery to work properly, the sending node needs to receive a proper response to resolve an address. Likewise, a node, such as CD 40(2), may need to send packets to another node, such as CD 40(1). CD 40(2) needs to resolve the MAC address of CD 40(1) in a similar manner.

Due to the mobility of CDs, a CD can, while at any AP, generate an IPv6 address. To do so, the CD needs to perform Duplicate Address Detection (DAD). The DAD is a mechanism whereby a node can ensure that the IPv6 address it generates does not conflict with any other node's IPv6 address on that link, that is, in that IPv6 subnet. In addition, a link layer address resolution is performed by IPv6 nodes by exchanging a series of NS and NA messages.

A node performs a DAD procedure as specified in RFC-4861, by sending an NS message to a solicited-node-multicast-group address. In a networking environment where CDs can roam from one AP to another, executing the DAD procedure can become complex. A solicited-node multicast-group address is formed from the last 24 bits of the IPv6 address. Instead of sending a broadcast message, a node sends a request to this multicast-group address. This is done both for the DAD mechanism and for link layer address resolution.

Nevertheless, IPv6 address mobility for a CD is important. A CD can roam to a different AP within the mobility domain and continue to use its IPv6 addresses, and it should not detect any change with respect to its layer-3 configuration. The CD should continue to operate, from the IPv6/layer-3 perspective, as if it has not moved to a different point on the network.

The IPv6 protocol uses the concept of link-local addresses. A link-local address is like any other 128-bit IPv6 address, but with a common prefix FE80::, such that packets sent to a link-local address are never forwarded beyond the router. Every IPv6 link has a built-in FE80 prefix, where every node generates an address from that prefix.

In the above scenario, when a CD moves and attaches to an AP that is configured to serve CDs in a different (i.e., "foreign") VLAN (under control of a so-called "foreign" controller), there is a possibility that the link-local address of the CD conflicts with the link-local address of the foreign controller because the DAD procedure that was run for those addresses were performed in a different scope (different VLANs).

DHCPv6 works similar to DHCPv4. There is a relay agent on every link and there is a DHCP server somewhere. When a node requests an address, the relay agent sets the prefix hint in the request and the message is routed to the DHCP server. The DHCP server looks at the prefix hint and allocates an address from that prefix block.

A domain-wide uniqueness for even link-local addresses is needed in order to avoid conflicts at the link-local address level. Furthermore, it is necessary to ensure that a CD that roams to an AP under a foreign controller can send a DHCP request and obtain an IPv6 address from its prefix block.

Accordingly, each controller 20(1)-20(3) is configured to act as a proxy for the ND messages of all CDs. The controllers 20(1)-20(3) do not act as proxy-standard ND client. That is, they are configured not to present its own MAC address, but to send a response message (in the course of a ND process) as if the NA message was sent by the "real" device (e.g., another CD) that was the target of a ND message. In this way, the ND messages are ensured to terminate at the controller and there is no need to perform a domain wide broadcast.

The proxy ND scheme specified in RFC-4861 requires the controller to take over the role of another IPv6 node and to be in path for all data traffic. By contrast, according to the techniques described herein, the controllers are configured to be in the path for control traffic but not for data traffic. A target mobile node (e.g., a CD) is logically present on the IPv6 link and consequently allowing a third party node to defend the target mobile node's address is not possible because there will be a conflict as to which device is defending the target mobile node's IPv6 address. Therefore, the controller is configured to send responses to ND messages in such a way that the devices that receive the response messages believe that they were sent not by the controller but by another device, e.g., another device that is already using an IPv6 address or a layer-2 address that was specified in the ND message to which the controller sent the response. All ND resolutions are terminated from the wired side of the network at the controller, while the data traffic is directly forwarded to the mobile node.

The controllers 20(1)-20(3), via the aforementioned CAPWAP or other layer-2/layer-3 tunnels, communicate with each other in order to share information as to the which VLAN each CD belongs. In addition, through these same tunnels, when a CD roams from one AP to another AP, the controller associated with the AP to which the CD roamed shares information with the controller for that controls the APs which serve CDs in the VLAN to which the CD belongs. In this way, at any given time, each controller stores "mobility data" that comprises information identifying all other controllers that control one or more APs that serve CDs in other VLANs, and to which one or more APs at least one CD has roamed. Moreover, each controller stores information identifying each of the one or more APs that it controls.

As an example, the IPv6 mobility state for a CD may comprise the following information.
    Link-layer Address: 00-18-DE-97-C2-51
    IPv6 Home Network Prefix: CAFE::/128
    IPv6 Link-local Address: FE80::218:deff:fe97:c250
    IPv6 Global Address (1): CAFE::deff:fe97:c250/128
    IPv6 Global Address (2): CAFE::1/128
    IPv6 Global Address (3): CAFE::2/128
    Home VLAN: eng-net
    Home Controller: 174.14.1.2
    Foreign Controller (Current Anchor): 174.14.11.1
    IPv4 Mobility State: <CURRENT STATE>

Figure 2:
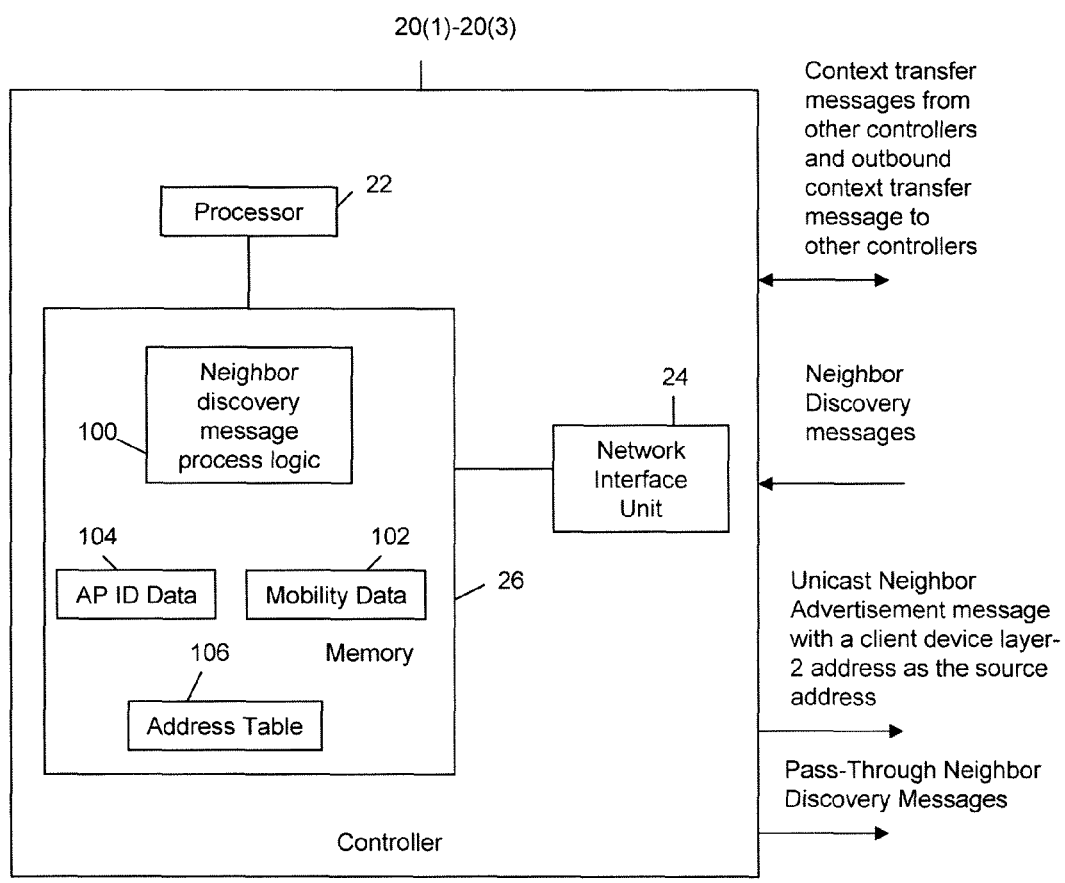
FIG. 2 is a block diagram for a controller that is configured to generate responses to neighbor discovery messages so that the response messages appear as if they were sent by a wireless mobile client device that is using a target network address specified in a received neighbor discovery message.

Referring now to FIG. 2, a block diagram is shown that is meant to represent an example of a block diagram for the controllers 20(1)-20(3), which are configured to perform the ND message processing techniques described herein. There is a processor 22, a network interface unit 24 and a memory 26. The processor 22 is for example, a microprocessor, a microcontroller, a digital signal processor, etc. The network interface unit 24 is device that is configured to enable communications over a wired network according to any of a variety of networking protocols.

The memory 26 is a tangible processor readable or computer readable memory or medium that stores or encoded with instructions that, when executed by the processor 22, cause the processor 22 to perform functions described herein (in connection with process logic 100 and/or 400). For example, the memory 26 is encoded with instructions for neighbor discovery message process logic 100. The process logic 100 is described hereinafter in connection with FIGS. 3-8. The process 400 is described hereinafter in connection with FIG. 9.

While FIG. 2 shows a processing environment comprising a data processor 22 that executes software stored in memory 24, an alternative processing environment is a fixed data processing element, such as an application specific integrated circuit (ASIC) that is configured, through fixed hardware logic, to perform the functions of the logic 100. Yet another possible data processing environment is one involving one or more field programmable logic devices, or a combination of fixed processing elements and programmable logic devices.

The memory 26 also stores the aforementioned mobility data shown at reference numeral 102. Again, the mobility data comprises data concerning the VLAN for CDs and current controller locations of CDs (i.e., IDs for foreign controllers that control an AP to which a CD is currently attached). In addition, the memory 26 also stores AP IDs shown at 104 for all APs under its control and an address table 106 that comprises IPv6 addresses and MAC addresses of devices by observing various messages as described herein. The stored address table 106 is used to allow the controller to prevent assignment of the same IPv6 address and layer-2 addresses to multiple nodes. In addition, the stored address table 106 stores link-local addresses used by other controllers and learned through the exchange of context transfer messages with other controllers to avoid the use of the same address on different local links.

Thus, as depicted in FIG. 2, each controller is configured and in position to receive context transfer messages from other controllers (and to send context transfer messages to other controllers), to receive multicast ND messages from, e.g., CDs, and to send response messages comprising NA messages with a layer-2 address (e.g.,. of a CD) as the source address specified in the response NA messages. The layer-2 address specified in a response NA message is derived from the target address contained in a received multicast NA message or received NS message as described in more detail hereinafter. In addition, FIG. 2 shows that under certain circumstances, the controller also passes through neighbor discovery messages for normal processing in the network. In a fixed network environment (where CDs cannot roam from one VLAN to another), only the target node that is subscribed to a multicast group will receive the multicast NA messages. However, according to the techniques described herein, the controller is configured and positioned to receive all multicast ND messages in order to "pose" as a device that would normally respond to the ND message. Controllers also forward ND messages received from a roaming CD to the home controller for that CD where it is processed according to the techniques described herein.

Figure 3:
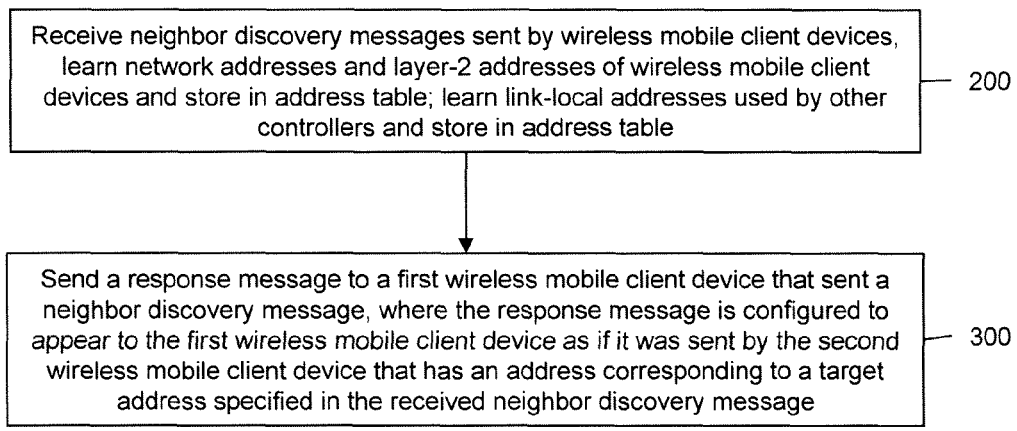
FIG. 3 is an example of a flow chart for a process executed in a controller to send responses to neighbor discovery messages so that the responses appear as if they were sent by a wireless mobile client device that is using a target network address specified in a received neighbor discovery message.

Turning to FIG. 3, a high level flow chart depicting the neighbor discovery message process logic 100 is shown. At 200, the controller receives ND messages sent by wireless mobile client devices (e.g., CDs) capable of roaming between APs. Each ND message specifies a target network address (e.g., IPv6 address) and a layer-2 address (e.g., MAC address) associated with the device that is the source of the ND message. In this way, the controller learns the IPv6 address that is the target of the ND message and the layer-2, e.g., MAC address, of the CD that sent the message. Examples of techniques for "snooping" on or observing ND messages to learn this information are described hereinafter in connection with FIGS. 4 and 5. The target network addresses and layer-2 addresses observed in received ND messages are stored in the address table 106 referred to in connection with FIG. 2. In addition, at 200, the controller learns link-local addresses used by other controllers (from context transfer messages received from other controllers) and stores this information in the address table 106. As explained above, a controller may receive a ND message that is forwarded to it from another controller that is associated with APs where a CD has roamed. In sum, at 200, the controller stores a set of network addresses and layer-2 addresses for CDs operating in a wired network based on ND messages received over time.

At 300, the controller sends messages in response to received ND messages based on a comparison of information contained in the ND messages with stored information in the address table. The controller configures each response message so that when it is received by the intended destination device, it appears to the destination device as if the message was sent by the device that was the target of the corresponding ND message. For simplicity, the device or node that is to receive the response message to the ND message is referred to arbitrarily as a "first" CD and the device or node that the ND message is configured to appear as the source of the response message is arbitrarily referred to as a "second" CD. Thus, the controller sends a response message to the first CD that sent a ND message, where the response message is configured to appear to the first CD as if it was sent by the second CD (and not as if it was sent by the controller), where the second CD has an address corresponding to the target address specified in the ND message received from the first CD. Depending on the neighbor discovery function requested by the ND message, in one example, the response message, an NA message, is also configured to indicate to the destination device that the target address is already in use, e.g., that the IPv6 address is already in use by the second CD. One way to indicate to the first CD that the response message was sent by the second CD (even though it is in fact not) is to send the response message using the layer-2 address of the second CD as a source address of the response message. Examples of situations where response messages are sent for different neighbor discovery functions are described hereinafter in connection with FIGS. 7 and 8. As explained above, in IPv6, a CD's network address is dependent on the particular virtual local area network to which it belongs and that is dependent on the AP to which it first attached when it enters the network. The process 100 allows a CD to generate a network address (an IPv6 address) and roam from one AP to another AP without the risk that the same network address will be used another CD that belongs to the VLAN. Thus, the techniques described herein allow for mobility of CDs that use IPv6 addresses by preventing two different CDs that belong to the same VLAN from using the same IPv6 address. Moreover, when a network address is determined to already be in use, an appropriately configured neighbor discovery response message is sent to a CD seeking to use that network address already in use such that the CD that receives the response message "believes" that it was sent by the device that is already using that network address.

Figure 4:
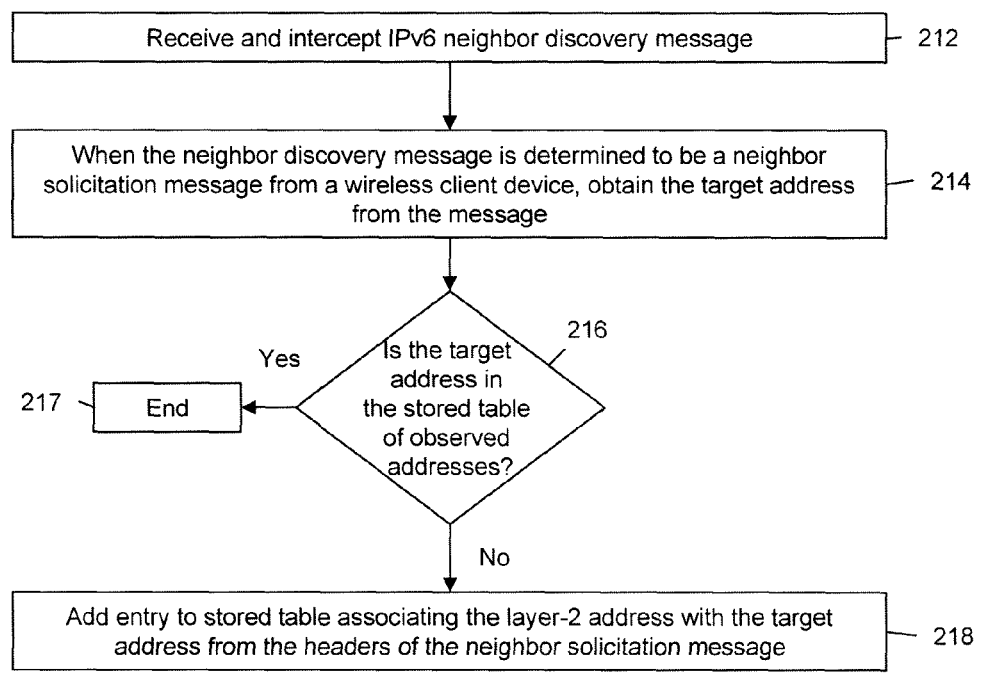
FIG. 4 is an example of a flow chart for a process by which a controller learns the network addresses and layer-2 addresses in use by wireless mobile client devices by observing neighbor discovery messages sent by wireless mobile client devices.

Turning now to FIG. 4, an example of a first process 210 is shown for observing a network address (IPv6 address) for a node operating in the network from an ND message received at the controller. Any node operating in the network environment, such as that shown in FIG. 1, performs a duplicate address detection (DAD) procedure to ensure that it does not generate a network address (IPv6 address) that is already in use. To this end, a CD sends an NS to a solicited-node multicast-group address.

For example, a first device sends an NS message with a network address (IPv6 address) with the following characteristic information:
Ethernet Header:
Src: Layer-2 (e.g., MAC) address of the first device
Dest: 33-33-FF-22-22-24
IPv6 Header:
Src: :: (unspecified)
Dest: FF02::1:FF22:2224 (solicited node multicast address)
Neighbor Solicitation Header:
Target Address: CAFE::2AA:FF:FE22:2224
where the target address of the NS message is CAFE::2AA:FF:FE22:2224 because this is the address that the first device is attempting to detect whether it is duplicated already in the network domain. This NS message is used to learn about network addresses already in use in the network.

Thus, at 212, an IPv6 ND message is received. At 214, when an incoming ND message is determined to be an NS message, the NS message is parsed to obtain the target address (network address, e.g., IPv6 address, specified in the message) from the header. At 216, the target address obtained from the NS message is compared against the stored information in the address table. If the target address from the NS message is already in the address table, then this process 210 ends at 217. Otherwise, when the target address from the NS message is not in the stored information in the address table, then at 218 the controller adds an entry in the stored information in the address table to include that target address and a layer-2 address specified in the NS message. The entry associates the layer-2 address with the target address obtained from the headers of NS message.

On the basis of the example NS message above, the address table would be populated with an entry as follows.

| Entry ID | IPv6 Address | Layer-2 Address |
|---|---|---|
| N | CAFE::2AA:FF:FE22:2224 | 00-G3-68-DE-45-FF |

Figure 5:
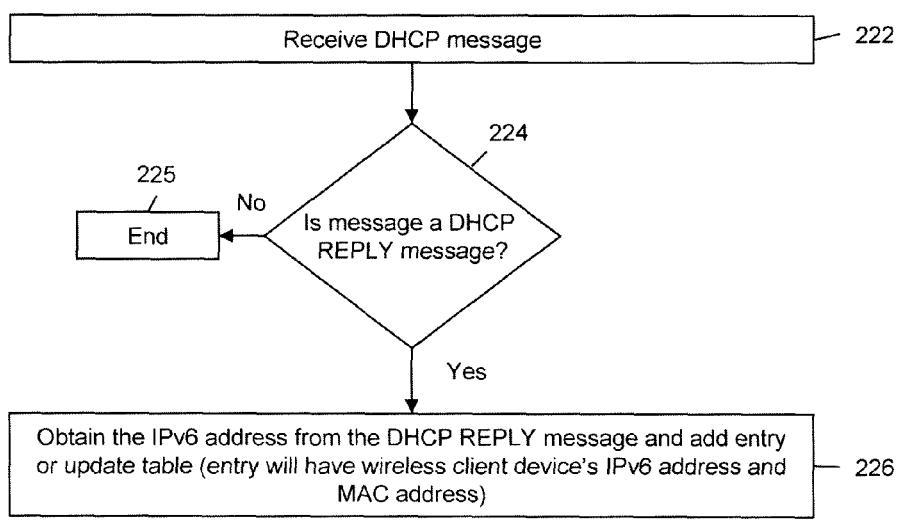
FIG. 5 is an example of a flow chart for a process by which a controller learns the network addresses in use by wireless mobile client devices by observing dynamic host configuration protocol messages.

Turning now to FIG. 5, an example of another process 220 is shown in which the controller tracks DHCP messages. At 222, the controller receives a DHCP message. At 224, the controller examines the DHCP message to determine if it is a DHCP REPLY message (sent by a DHCP relay agent, for example). A field in the DHCP packet indicates whether it is a REQUEST or a REPLY. If the DHCP is not a DHCP REPLY message, it is ignored and the process 220 ends at 225. On the other hand, when the DHCP message is determined to be a DHCP REPLY message, then at 226, the controller obtains the IPv6 address contained in the DHCP REPLY message and adds an entry to the stored information in the address table to include the IPv6 address and the layer-2 address specified in the DHCP REPLY message. The IPv6 address and layer-2 address contained in the DHCP REPLY message pertains to the node to which the DHCPY REPLY message was intended to be sent, and thus, reveals an IPv6 address and an associated layer-2 address that are in use in the network domain.

Figure 6:
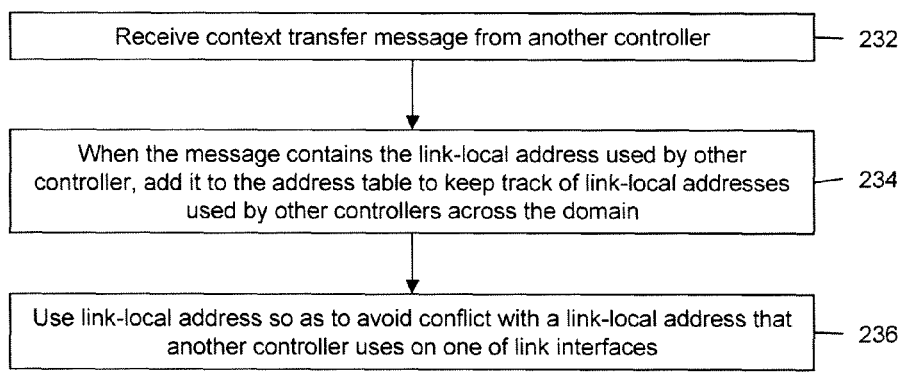
FIG. 6 is an example of a flow chart for a process by which a controller learns the network addresses used by other controllers for link-local traffic.

FIG. 6 illustrates a process 230 by which a controller learns about link-local addresses used by other controllers. At 232, a controller receives a context transfer message from another controller. A context transfer message contains information obtained by another controller as to the mobility status of CDs that operate in the VLAN controlled by that controller as well as link-local addresses used by the other controller on any of its link interfaces. For example, the controller uses an IPv6 address when communicating over its wired network interface with its associated equipment. A link-local address is like any other 128-bit IPv6 address, for example, with a common prefix, e.g., "FE80::". Messages sent to a link-local address are never forwarded beyond the network router. Thus, every IPv6 link has a built-in "FE80" prefix, and every node generates an address from that prefix.

For example, table entries for link-local addresses used by other controllers may be as follows.

| Entry ID | Controller Layer-2 (MAC) Address | IPv6 Address |
|---|---|---|
| Z | MAC_ADDRESS_1 | IPv6_ADDRESS_1 |
| Z+1 | MAC_ADDRESS_2 | IPv6_ADDRESS_2, IPv6_ADDRESS_4 |

In this example, the table entry Z+1 has multiple IPv6 addresses used on its link-local interfaces.

At 236, the controller selects and uses a link-local address so as to avoid conflict with a link-local address that another controller uses on one of local link interfaces. Since link-local traffic is not subject to global address resolution procedures, configuring controllers to be aware of the link-local addresses used by other controllers in the mobility domain allows the controllers to select link-local addresses that are not in use by other controllers. Consequently, mobile nodes will generate domain-wide unique link-local addresses at their respective locally anchored (home) VLANs. In summary, the process 230 ensures that a controller learns the network addresses that each of the other controllers uses for link-local traffic, so that a controller selects a network address for its own link-local traffic that is not the same as a network address that another controller uses for link-local traffic.

In sum, the process of FIG. 6 involves exchanging information between a first controller and a second controller, wherein the information indicates network addresses that each controller uses for link-local traffic. A network address is selected for link-local traffic at the first controller that is not the same as a network address that the second controller uses for link-local traffic.

Figure 7:
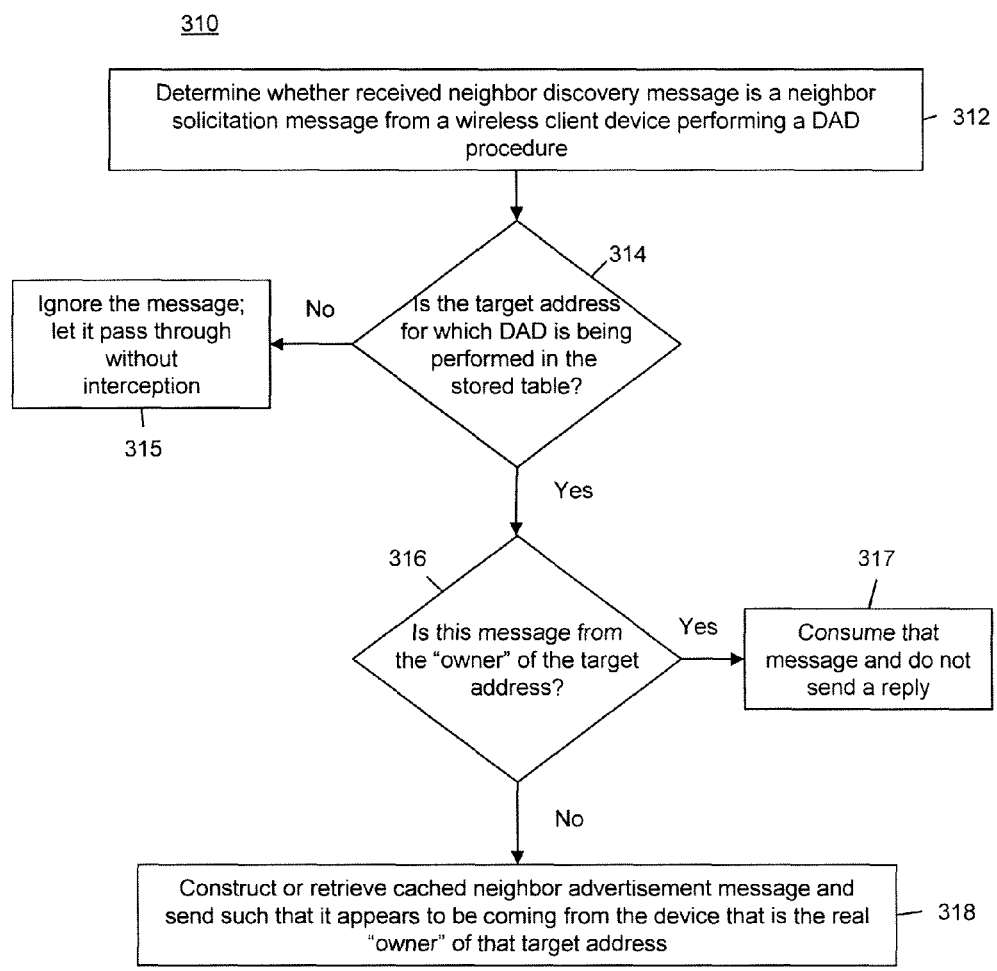
FIG. 7 is an example of a flow chart for a process by which a controller generates a unicast response message to a device that sent a neighbor solicitation message as part of a duplicate address detection procedure.

Turning now to FIG. 7, a process 310 is described by which a controller generates a response to a ND message sent as part of a DAD procedure on behalf of a CD whose address is the target address of the DAD procedure. As explained above, the DAD procedure allows a first CD, before using a network address, e.g., IPv6 address X, to send a request to the solicited-node multicast-group address (formed from the IPv6 address X). If some other node, e.g., a second CD, is already using address IPv6 address X, the second CD will be listening on that multicast group address and will send a response indicating that the second CD is using IPv6 address X. In the process 310, the controller checks for duplication. If there is an entry in the stored address table with IPv6 address X which is associated with some other node, e.g., second CD, then the controller declares that address is in use and sends a response to the first CD on behalf of the second CD. If no entry is found, the controller ignores the request from the first CD and lets it pass through with out interception.

At 312, the controller determines whether a received ND message is a NS message from a CD performing a DAD procedure. The node performing the DAD procedure on a given address sends the NS message with unspecified source address. The source address field in the IPv6 header of an ND message for a DAD procedure is set to unspecified address (::). The controller can identify the IPv6 ND packet (IPv6 Packet, ICMPv6 Packet, Sub Type=NS) and determine that is for a DAD procedure when the source address field is unspecified as indicated above. This is a key difference between a DAD procedure and an address resolution procedure described hereinafter in connection with FIG. 8. At 314, the controller compares the target address with the stored information in the address table to determine whether the target address specified in the NS message for the DAD procedure is in the stored address table. If the target address is not in the address table, then at 315, the controller ignores the NS message and lets it pass through without interception.

On the other hand, when the target address specified in the NS message is found in the stored address table, then at 316, the controller determines whether the NS message is sent by the real "owner" of the target address. In other words, the controller determines whether the NS message is being sent by the device whose layer-2 address is the same as the layer-2 address already stored in the address table in association with the target address. When the NS message is determined to be from the same CD that is already "registered" for that target address in the address table, then at 317, the controller "consumes" the message, does not allow it to continue on in the network and also does not send a reply to it.

When at 317 the controller determines (based on a comparison of the layer-2 address obtained from the source header of the NS message with the layer-2 address stored for that target address in the address table) that the message is from a device other than the device that is identified in the stored address table for that target address, then the function 318 is performed. At 318, the controller sends an NA message to the device that sent the NS message, wherein the NA message is configured to appear as if it was sent by the device that is the "real" owner of the target address based on information contained in the address table. For example, if the NS message is sent by a first CD that specifies a network address determined to already be in use by a second CD, then the controller sends a NA message configured to use as its source address the layer-2 address of the second CD so that it appears to the first CD that it was sent by the second CD. Moreover, the NA message is configured to inform the first CD that the target address contained in the NS message is already in use so that the first CD does not adopt and use that network address.

The unicast NA message that is sent at 318 may be sent from a cached NA message or if there is no cached NA message, then an NA message is generated. More specifically, the controller will temporarily store (cache) multicast NA messages received from CDs over a period of time. This may be part of the controller functions at 200 (FIG. 1) with respect to received ND messages. When an NS message is received that necessitates an NA to be transmitted (at 318), then a stored multicast NA message is converted to a unicast NA message address to the device that sent the NS message. For example, if there is a stored multicast NA message from a second CD that is determined to already be using an IPv6 address specified in an NS message received from a first CD, then the controller retrieves that stored multicast NA message, converts it to a unicast NA message by replacing the multicast address in the NA message with the address (obtained from the received NS message) of the first CD and sends the NA message as a unicast NA message to the first CD (where the source address of the NA message is the layer-2 address of the second CD) so that the first CD believes the NA message was sent by the second CD. When there is no stored (cached) NA message from the second CD, the controller generates a unicast NA message addressed to the first CD (again with the layer-2 address of the second CD being used as the source address for the unicast NA message).

In sum, the process of FIG. 7 allows a controller to recognize when a ND message is for a DAD procedure and which specifies as the target address a network address for use by a CD, e.g., a first CD, in the wired network and a layer-2 address of the first CD. The controller compares the network address in the received ND message with the stored address table information and sends a response message (e.g., a NA message) when it determines that the network address is already in use by another CD, e.g., a second CD.

Figure 8:
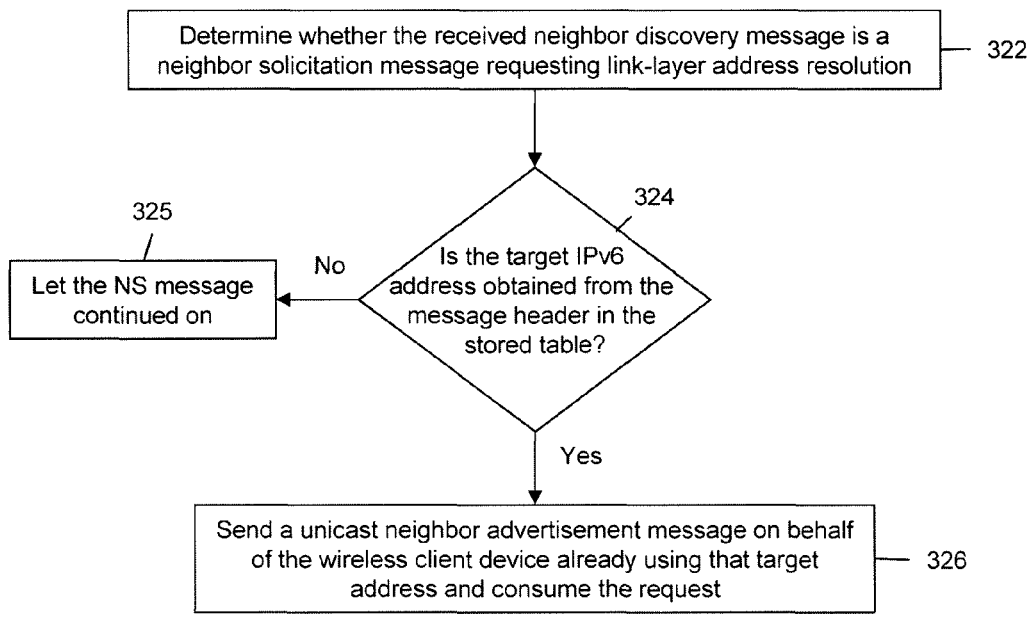
FIG. 8 is an example of a flow chart for a process by which a controller generates a unicast response message to a device that sent a neighbor solicitation message as part of an address resolution procedure.

Referring now to FIG. 8, a process 320 is shown whereby the controller responds to address resolution requests. At 322, the controller determines whether a received ND message is an NS message requesting link-layer address resolution. In other words, an NS message requesting link-layer address resolution specifies as a target address a network address of another device and request the layer-2 address for the device using the specified network address. At 324, the target address specified in the header of the NS message, which is an IPv6 address, is compared against the information contained in the address table. When it is determined that the IPv6 address specified in the NS message is not in the address table, then at 325, the controller lets the NS message continue on in the wired network. However, when the IPv6 address specified in the NS message is in the address table, then the controller sends to the device that sent the NS message a unicast NA message, using as a source address the layer-2 address of the node using that target IPv6 address. The NA message is configured to inform the device that sent the NS message of the layer-2 address of the device that is using the specified IPv6 message by configuring the responsive NA message to use that layer-2 address as source field of the NA message. For example, if the NS message came from a first CD that specifies a target IPv6 address for link-layer resolution, and the target IPv6 address is determined to be in use by a second CD, then the controller generates and sends a unicast NA message addressed to the first CD and using the layer-2 address of the second CD (obtained from the stored address table from which a match was found) as the source address of the NA message. As a result, the first CD now knows the layer-2 address of the second CD.

In a further variation to the process 320, capability is provided to handle ND messages that have a "secure" option set or present in them. When a CD sends a secure ND message, it is sent to a multicast address. When the controller receives a ND message for layer-2 address resolution and determines that the secure option is set for the ND message, the controller changes the multicast address of the secure ND message to the layer-2 address of the CD that is the target of the ND message (based on the network address specified as the target address in the secure ND message). The controller then forwards the ND message to the CD that is the target of the secure ND message in order for that CD to respond to the secure ND message. The reason for handling a secure ND in this manner is because the response needs to come from the target CD itself (signed or authenticated by the target CD) due to the secure nature of the ND message and for this reason the controller cannot send the response message on behalf of the target CD.

The techniques described herein may be invoked with respect to ND messages forwarded from one controller to another controller. An example scenario is as follows. A first controller is provided that is configured to control one or more APs that serve CDs which belong to a first VLAN. A second controller is provided that is configured to control one or more APs that serve CDs which belong to a second VLAN. A communication path comprising a layer-2 or layer-3 tunnel is provided for messages between the first and second controllers. An example of such a configuration is shown in FIG. 1.

At the second controller, a ND message is received that is sent from a first CD that belongs to the first VLAN. The received ND message specifies a target address for a neighbor discovery function. The second controller forwards the ND message received from the first CD via the communication path to the first controller. The first controller then processes the ND message on behalf of the first CD using any one or more of the processes described herein in connection with FIGS. 3-8. The first controller performs the observing and storing function 200 and the response message generating function 300 (in all the various forms described herein). After generating a response message, the first controller forwards the response message via the communication path to the second controller for wireless transmission to the first CD from one of the APs under control of the second controller.

One particular example situation is when the ND message received at the second controller is a DHCP address request (DHCP REQUEST) message received from a first CD that belongs to the first VLAN. The second controller forwards the DHCP REQUEST message to the first controller when it determines that is from a CD that belongs to the first VLAN. The first controller then sends the DHCP address request message to its associated network router (that serves the first VLAN) such that a DHCP relay agent associated with a link for the network router sets a link-address field of a relay forward message that is supplied to the network router to a prefix set associated with the first VLAN. As a result, the first CD can obtain a network address from a DHCP server while attached to an AP that is under control of different controller, e.g., the second controller in this example.

The ND message handing techniques described herein may be implemented in a controller, an example block diagram of which is shown in FIG. 2. To this end, an apparatus is provided that is configured to perform the ND message handling techniques. The apparatus comprises a network interface unit configured to send and receive messages over a wired network and a processor. The processor is configured to capture neighbor discovery messages sent by wireless mobile client devices capable of roaming between wireless access points that are configured to serve wireless mobile client devices that are part of different virtual local area networks, the neighbor discovery messages specifying a target address for a neighbor discovery function; store information representing a set of network addresses and layer-2 addresses for wireless mobile client devices operating in a wired network; and generate a response message to a first wireless mobile client device that sent a neighbor discovery message, wherein the response message is configured to appear to the first wireless mobile client device as if it was sent by a second wireless mobile client device that has an address corresponding to the target address specified in the neighbor discovery message.

Similarly, the ND message handling techniques may be embodied by a processor readable medium that stores instructions, that when executed by a processor, cause the processor to capture neighbor discovery messages sent by wireless mobile client devices capable of roaming between wireless access point devices that are configured to serve wireless mobile client devices that are part of different virtual local area networks, the neighbor discovery messages specifying a target address for neighbor discovery function; store information representing a set of network addresses and layer-2 addresses for wireless mobile client devices operating in a wired network; and generate a response message to a first wireless mobile client device that sent a neighbor discovery message, wherein the response message is configured to appear to the first wireless mobile client device as if it was sent by a second wireless mobile client device that has an address corresponding to the target address specified in the neighbor discovery message Although the techniques are illustrated and described herein as embodied in one or more specific examples, it is nevertheless not intended to be limited to the details shown, since various modifications and structural changes may be made therein without departing from the scope of the and range of equivalents of the claims.

What is claimed is:

1. A method comprising:
receiving a neighbor discovery message sent by a first wireless mobile client device capable of roaming between wireless access point devices that are configured to serve wireless mobile client devices that are part of different virtual local area networks, the neighbor discovery message specifying a target address for a neighbor discovery function; and
in response to receiving the neighbor discovery message, sending to the first wireless mobile client device a response neighbor advertisement message addressed to the first wireless mobile client device, wherein the neighbor advertisement message is configured to appear to the first wireless mobile client device as if it was sent by a second wireless mobile client device that has an address corresponding to the target address specified in the neighbor discovery message, and the neighbor advertisement message is configured to specify a layer-2 address of the second wireless mobile client device as a source address of the neighbor advertisement message; and
storing multicast neighbor advertisement messages received from wireless mobile client devices over time; and
converting a stored multicast neighbor advertisement message to a unicast neighbor advertisement message addressed to the first wireless mobile client device to send to the first wireless mobile client device when it is determined that there is a stored multicast neighbor advertisement message received from the second wireless mobile client device.

2. The method of claim 1, and further comprising storing information representing a set of network addresses and layer-2 addresses for wireless mobile client devices operating in a wired network based on neighbor discovery messages received over time.

3. The method of claim 2, wherein receiving comprises receiving a Dynamic Host Configuration Protocol (DHCP) reply message and obtaining a network address and layer-2 address specified in the DHCP reply message, and wherein storing comprises storing in the set the network address and layer-2 address obtained from the DHCP reply message.

4. The method of claim 3, wherein receiving comprises receiving from the first wireless mobile client device a neighbor solicitation message requesting a layer-2address for the second wireless mobile client device based on the target address specified in the neighbor solicitation message, and wherein sending further comprises sending a unicast neighbor advertisement message addressed to the first wireless mobile client device using the layer-2address of the second wireless mobile client device as the source address of the neighbor advertisement message.

5. The method of claim 2, wherein sending comprises sending the response message using a layer-2 address of the second wireless mobile client device as a source address of the neighbor advertisement message.

6. The method of claim 5, wherein receiving comprises receiving the neighbor discovery message associated with a duplicate address detection procedure and which specifies as the target address a network address for use by the first wireless mobile client device in the wired network and a layer-2 address of the first wireless mobile client device, and further comprising comparing the network address in the received neighbor discovery message with the stored information, and wherein sending comprises sending the neighbor advertisement message when it is determined based on the comparing that the network address is already in use by the second wireless mobile client device.

7. The method of claim 6, and further comprising consuming the received neighbor discovery message and not sending the neighbor advertisement message when it is determined that the received neighbor discovery message is for a duplicate address detection procedure initiated by a wireless mobile client device whose layer-2 address and target address match a layer-2 address and network address in the stored information.

8. The method of claim 1, and further comprising generating a unicast neighbor advertisement message addressed to the first wireless mobile client device, and wherein sending comprises sending the unicast neighbor advertisement message.

9. The method of claim 1, wherein receiving and sending are performed at a controller coupled between a network router of a wired network and at least one wireless access point operating in wireless local area network.

10. A method comprising:
receiving a neighbor discovery message sent by a first wireless mobile client device capable of roaming between wireless access point devices that are configured to serve wireless mobile client devices that are part of different virtual local area networks, the neighbor discovery message specifying a target address for a neighbor discovery function;
in response to receiving the neighbor discovery message, sending to the first wireless mobile client device a response message that is configured to appear to the first wireless mobile client device as if it was sent by a second wireless mobile client device that has an address corresponding to the target address specified in the neighbor discovery message;
determining whether a secure neighbor discovery option is present in the received neighbor discovery message that is configured for layer-2 address resolution of the target address that corresponds to a network address of the second wireless mobile client device;
changing a multicast address of the neighbor discovery message to a layer-2 address of the second wireless mobile client device; and
forwarding the neighbor discovery message to the second wireless mobile client device for response by the second wireless mobile client device.

11. A method comprising:
providing a first controller configured to control one or more wireless access point devices that serve wireless mobile client devices that belong to a first virtual local area network and a second controller configured to control one or more wireless access point devices that serve wireless mobile client devices that belong to a second virtual local area network;
providing a communication path comprising a layer-2 or layer-3 tunnel for messages between the first and second controllers;
at the second controller, receiving a neighbor discovery message sent from a first wireless mobile client device that belongs to the first virtual local area network, the neighbor discovery message specifying a target address for a neighbor discovery function;
forwarding the neighbor discovery message received from the first wireless mobile client device via the communication path from the second controller to the first controller;
exchanging information between the first controller and the second controller, wherein the information indicates network addresses that each controller uses for link-local traffic;
selecting a network address for link-local traffic at the first controller that is not the same as a network address that the second controller uses for link-local traffic;
wherein receiving and forwarding are performed with respect to a Dynamic Host Configuration Protocol (DHCP) address request message received from the first wireless mobile client device; and
at the first controller, sending the DHCP address request message to a network router configured to serve the first virtual local area network such that a DHCP relay agent associated with a link for the network router sets a link-address field of a relay forward message that is supplied to the network router to a prefix set associated with the first virtual local area network so that the first wireless mobile client device can obtain a network address from a DHCP server while attached to a wireless access point device that is under control of the second controller.

12. The method of claim 11, and further comprising, at the first controller, receiving the neighbor discovery message forwarded from the second controller and generating a response message that is configured to appear to the first wireless mobile client device as if it was sent by a second wireless mobile client device that has an address corresponding to the target address specified in the neighbor discovery message; and forwarding the response message via the communication path from the first controller to the second controller for wireless transmission to the first wireless mobile client device from one of the wireless access point devices under control of the second controller.

13. The method of claim 12, wherein at the first controller, further comprising storing information representing a set of network addresses and layer-2 addresses for wireless mobile client devices operating in a wired network, and wherein generating comprises generating the response message using a layer-2 address of the second wireless mobile client device as a source address of the response message.

14. The method of claim 13, wherein the received neighbor discovery message is associated with a duplicate address detection procedure and which specifies as the target address a network address for use by the first wireless mobile client device in the wired network and a layer-2 address of the first wireless mobile client device, and wherein at the first controller, further comprising comparing the network address in the received neighbor discovery message with the stored information, and wherein generating comprises generating the response message when it is determined based on the comparing that the network address is already in use by the second wireless mobile client device.

15. The method of claim 13, wherein the neighbor discovery message received from the first wireless mobile client device is a neighbor solicitation message requesting a layer-2 address for the second wireless mobile client device based on the target address specified in the neighbor solicitation message, and wherein generating comprises generating a unicast neighbor advertisement message addressed to the first wireless mobile client device using the layer-2 address of the second wireless mobile client device as the source address of the neighbor advertisement message.

16. The method of claim 11, further comprising determining whether a secure neighbor discovery option is present in the received neighbor discovery message that is configured for layer-2 address resolution of the target address that corresponds to a network address of the second wireless mobile client device, changing a multicast address of the neighbor discovery message to a layer-2 address of the second wireless mobile client device and forwarding the neighbor discovery message to the second wireless mobile client device for response by the second wireless mobile client device.

17. An apparatus comprising:
a network interface unit configured to send and receive messages over a wired network; and
a processor configured to:
capture neighbor discovery messages sent by wireless mobile client devices capable of roaming between wireless access points that are configured to serve wireless mobile client devices that are part of different virtual local area networks, the neighbor discovery messages specifying a target address for a neighbor discovery function;
store information representing a set of network addresses and layer-2 addresses for wireless mobile client devices operating in a wired network;
generate a response message to a first wireless mobile client device that sent a neighbor discovery message, wherein the response message is configured to appear to the first wireless mobile client device as if it was sent by a second wireless mobile client device that has an address corresponding to the target address specified in the neighbor discovery message;
determine whether a secure neighbor discovery option is present in the received neighbor discovery message that is configured for layer-2 address resolution of the target address that corresponds to a network address of the second wireless mobile client device;
change a multicast address of the neighbor discovery message to a layer-2 address of the second wireless mobile client device; and
forward the neighbor discovery message to the second wireless mobile client device for response by the second wireless mobile client device.

18. The apparatus of claim 17, wherein the processor is further configured to generate the response message using a layer-2 address of the second wireless mobile client device as a source address of the response message.

19. The apparatus of claim 18, wherein the processor is configured to capture a received neighbor discovery message associated with a duplicate address detection procedure and which specifies as the target address a network address for use by the first wireless mobile client device in the wired network and a layer-2 address of the first wireless mobile client device, and wherein the processor is further configured to compare the network address in the received neighbor discovery message with the stored information and to generate the response message when it is determined that the network address is already in use by the second wireless mobile client device.

20. The apparatus of claim 17, wherein the processor is further configured to capture neighbor discovery messages including a neighbor solicitation message from the first wireless mobile client device, which neighbor solicitation message specifies a layer-2 address for the second wireless mobile client device based on the target address specified in the neighbor solicitation message, and to generate as the response message a unicast neighbor advertisement message addressed to the first wireless mobile client device using the layer-2 address of the second wireless mobile client device as the source address of the neighbor advertisement message.

21. The apparatus of claim 17, wherein the processor is further configured to send a neighbor advertisement message addressed to the first wireless mobile client device, wherein the neighbor advertisement message is configured to specify a layer-2 address of the second wireless mobile client device as the source address of the neighbor advertisement message.

22. The apparatus of claim 21, wherein the processor is further configured to store multicast neighbor advertisement messages received from wireless mobile client devices over time, and to send the neighbor advertisement message by converting a stored multicast neighbor advertisement message to a unicast neighbor advertisement message addressed to the first wireless mobile client device when it is determined that there is a stored multicast neighbor advertisement message received from the second wireless mobile client device.

23. A non-transitory processor readable medium storing instructions that, when executed by a processor, cause the processor to:
capture neighbor discovery messages sent by wireless mobile client devices capable of roaming between wireless access point devices that are configured to serve wireless mobile client devices that are part of different virtual local area networks, the neighbor discovery messages specifying a target address for neighbor discovery function;
store information representing a set of network addresses and layer-2 addresses for wireless mobile client devices operating in a wired network; and
generate a neighbor advertisement message to a first wireless mobile client device that sent a neighbor discovery message, wherein the neighbor advertisement message is configured to appear to the first wireless mobile client device as if it was sent by a second wireless mobile client device that has an address corresponding to the target address specified in the neighbor discovery message, and the neighbor advertisement message is configured to specify a layer-2 address of the second wireless mobile client device as a source address of the neighbor advertisement message;
store multicast neighbor advertisement messages received from wireless mobile client devices over time; and
convert a stored multicast neighbor advertisement message to a unicast neighbor advertisement message addressed to the first wireless mobile client device to send to the first wireless mobile client device when it is determined that there is a stored multicast neighbor advertisement message received from the second wireless mobile client device.

24. The non-transitory processor readable medium of claim 23, further comprising instructions operable to send the neighbor advertisement message addressed to the first wireless mobile client device, wherein the neighbor advertisement message is configured to specify a layer-2 address of the second wireless mobile client device as the source address of the neighbor advertisement message.

25. The non-transitory processor readable medium of claim 23, further comprising instructions operable to determine whether a secure neighbor discovery option is present in the received neighbor discovery message that is configured for layer-2 address resolution of the target address that corresponds to a network address of the second wireless mobile client device, to change a multicast address of the neighbor discovery message to a layer-2 address of the second wireless mobile client device and to forward the neighbor discovery message to the second wireless mobile client device for response by the second wireless mobile client device.

* * * * *

UNITED STATES PATENT AND TRADEMARK OFFICE
CERTIFICATE OF CORRECTION

| | | |
|---|---|---|
| PATENT NO. | : 8,724,583 B2 | Page 1 of 1 |
| APPLICATION NO. | : 12/612131 | |
| DATED | : May 13, 2014 | |
| INVENTOR(S) | : Gundavelli et al. | |

It is certified that error appears in the above-identified patent and that said Letters Patent is hereby corrected as shown below:

In the Claims

Column 14, Line 25, please remove "and" after "function;".

Column 14, Line 28, please remove "response".

Signed and Sealed this
Fifteenth Day of March, 2016

Michelle K. Lee
*Director of the United States Patent and Trademark Office*